US005141765A

United States Patent [19]

Shimizu

[11] Patent Number: 5,141,765

[45] Date of Patent: Aug. 25, 1992

[54] METHOD OF MAKING EGG FOOD PRODUCT

[75] Inventor: Yasuhiro Shimizu, Isehara, Japan

[73] Assignee: Toshin Technical Co., Ltd., Kanagawa, Japan

[21] Appl. No.: 410,440

[22] Filed: Sep. 21, 1989

Related U.S. Application Data

[63] Continuation-in-part of Ser. No. 214,804, Jul. 1, 1988, abandoned, which is a continuation of Ser. No. 711,428, Mar. 13, 1985, abandoned.

[30] Foreign Application Priority Data

Mar. 12, 1984 [JP] Japan ................................ 59-45596

[51] Int. Cl.[5] ................................ A23L 1/00

[52] U.S. Cl. ................................ 426/614; 426/89; 426/282

[58] Field of Search ................................ 426/614, 89, 282; 99/422

[56] References Cited

U.S. PATENT DOCUMENTS

| | | | |
|---|---|---|---|
| 3,026,822 | 3/1962 | Gatti | 426/92 |
| 3,666,388 | 5/1972 | Oberwelland et al. | 425/261 |
| 3,851,571 | 12/1974 | Nichols | 99/450.6 |
| 3,958,035 | 5/1976 | Stearns et al. | 426/614 |
| 4,176,593 | 12/1979 | Terzian | 99/422 |
| 4,425,367 | 1/1984 | Berkowitz et al. | 426/89 |
| 4,426,400 | 1/1984 | Newlin et al. | 426/282 |

FOREIGN PATENT DOCUMENTS 59-63160 10/1984 Japan .

OTHER PUBLICATIONS

Berolzheimer, 300 Ways to Serve Eggs, published by Consolidated Book Publishers, Chicago, Ill., 1950, p. 44.

Chamberlain, N., *The Omelette Book, New York, 1956, p. 124.*

*Primary Examiner*—George Yeung

*Attorney, Agent, or Firm*—Guy W. Shoup; Norman R. Klivans

[57] ABSTRACT

An egg food product is formed by enveloping rice or like filling material in a roasted egg film where a raw portion of the film remains and contacts the filling material and upon further cooking; forms a self-adherent body. This egg food product has the advantage of being easily manufactured, handled, and can also be prepared as a frozen food.

3 Claims, 4 Drawing Sheets

METHOD OF MAKING EGG FOOD PRODUCT

RELATED APPLICATIONS

This application is a continuation-in-part of U.S. Ser. No. 07/214,804, filed Jul. 1, 1988, now abandoned, which is a continuation of U.S. Ser. No. 06/711,428, filed Mar. 3, 1985, now abandoned.

FIELD OF THE INVENTION

The invention relates to egg food products and a method of making them. It particularly relates to an improved method for obtaining a combination of a thin film of roasted egg enveloping flavored rice or wheat.

BACKGROUND OF THE INVENTION

Conventionally, an egg rice product has almost always been prepared by hand. First, a thin film of roasted egg is made; then, flavored rice is placed on said roasted egg thin film and then an end portion of said thin film of roasted egg is rolled and contacted with another end portion of the thin film of roasted egg. However, the roasted egg thin film and the rice do not adhere to form one body, they separate easily when eaten and are very difficult to easily handle or to eat. Further, it is very difficult to freeze such a hand made product.

In this conventional method, the thin film of roasted egg is extremely thin, the flavored rice is not pre-shaped before being contacted with the roasted egg thin film and it is very difficult to make egg food products by an automatic machine process or to make many frozen egg food products.

OBJECTS OF THE INVENTION

The present invention is designed to eliminate the above noted difficulties and inadequacies. The object of the present invention is to provide improved egg food products which can be automatically made by a machine process and can also be prepared as frozen food products.

DETAILED DESCRIPTION

Figure 1:
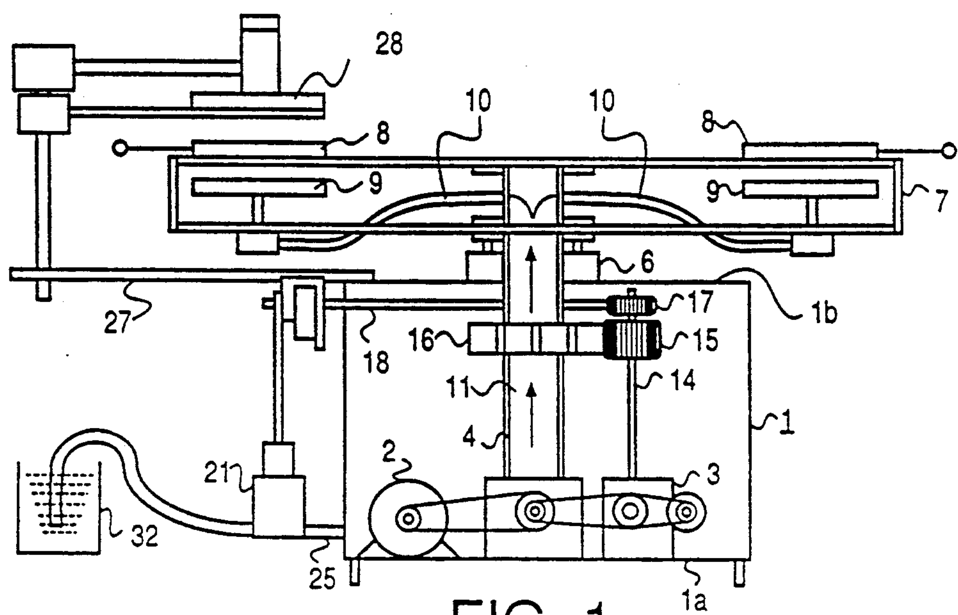
FIG. 1 shows a cross sectional view of a machine, parts of which are used to make the product and practice the process of the present invention.
Figure 2:
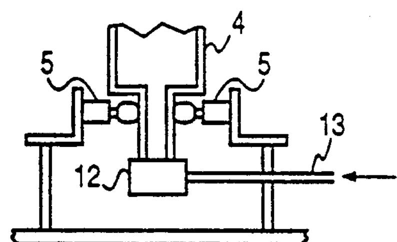
FIG. 2 shows a vertical cross sectional view of the lower portion of the central supporting member of the machine of FIG. 1.

FIG. 1 shows a box shaped housing 1 for the machine. A driving motor 2 and driving mechanism 3 are mounted on a base plate 1*a* of the housing 1. A supporting standard 4 is rotatably mounted in base member 1. The supporting standard 4 is supported by a bearing portion 5 (FIG. 2) which is mounted between said housing base portion 1*a* and the upper portion 1*b* of said housing 1. The supporting standard 4 is constantly supported by a bearing portion 6.

A rotary table 7 is fixedly mounted on a top of the supporting standard 4 and a plurality of pans 8 are carried by said rotary table 7. A plurality of gas burners 9 are respectively positioned under pans 8. A plurality of gas pipes 10 connected to said gas burners 9 are connected at their other end to a cavity 11 in said supporting standard 4. An end portion of cavity 11 is connected with a gas hose 13 (FIG. 2) via a rotary gas connection joint 12, whereby gas is supplied to each gas burner 9.

A gear 16 operatively associated with said supporting standard 4 is engaged to an output gear 15 on an output shaft 14 of said driving mechanics 3, whereby said supporting standard 4 is rotated. Gear 17 of said output shaft 14 is also connected with a connecting axis 18 of said housing 1.

Figure 3:
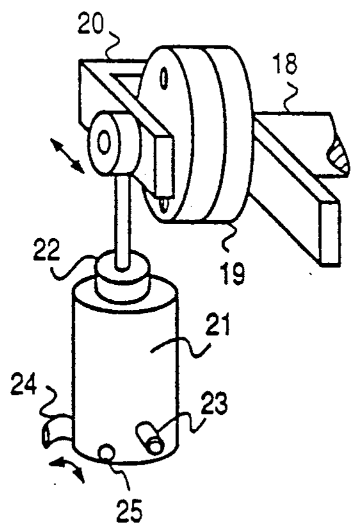
FIG. 3 shows a perspective view of the supply pump for the machine of FIG. 1.

In FIG. 3, piston 22 of a supporting pump 21 is connected with a disc member 19 on said connecting axis 18 via crank arm 20. Arm 20 is slidably positioned in the direction of the arrow which determines the stroke of said piston 22. An input reverse stop valve 23 and output reverse valve 24 are mounted on said supporting pump 21 and said supporting pump 21 is swung on said base member 1 by axis 25 (FIG. 1).

Figure 4:
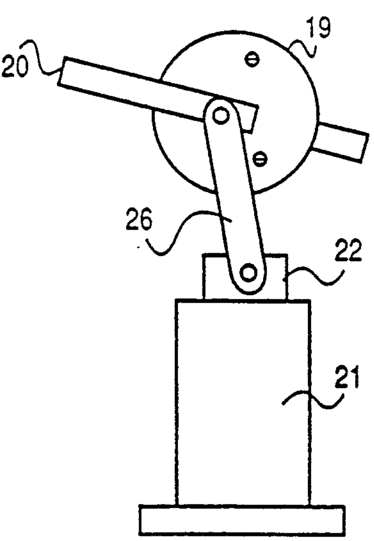
FIG. 4 shows a perspective view of the supply pump of another embodiment of the machine used to practice the process.

FIG. 4 illustrates another embodiment of FIG. 3 in which said supporting pump 21 is fixed and has a connection member 26 which connects said piston 22 to arm 20 and swings thereby.

Figure 5:
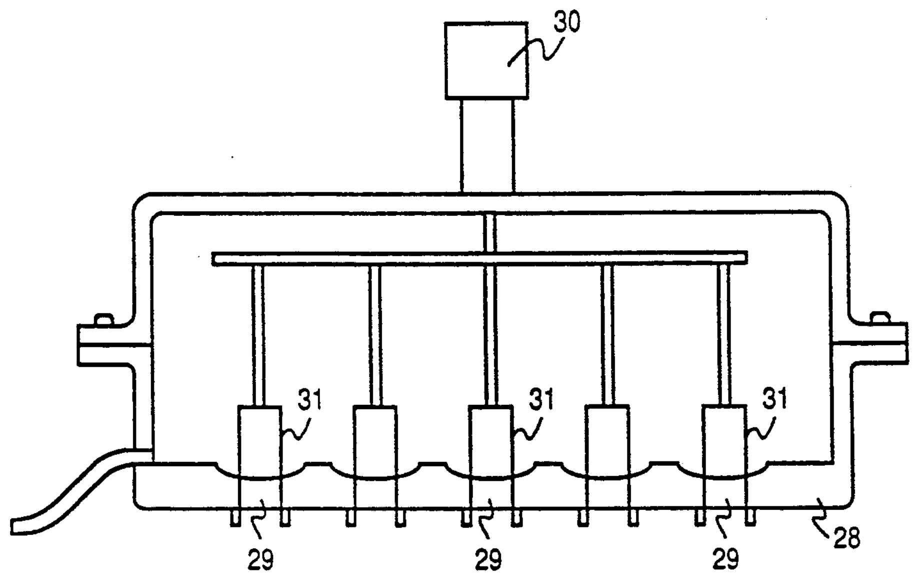
FIG. 5 is a cross sectional view of an overhead material supply member for the machine.
Figure 6:
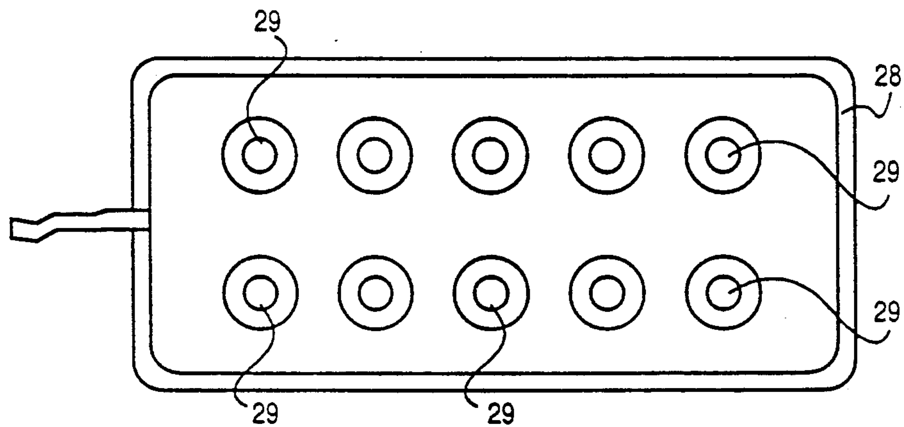
FIG. 6 shows a view from below of the overhead material supply member.
Figure 7:
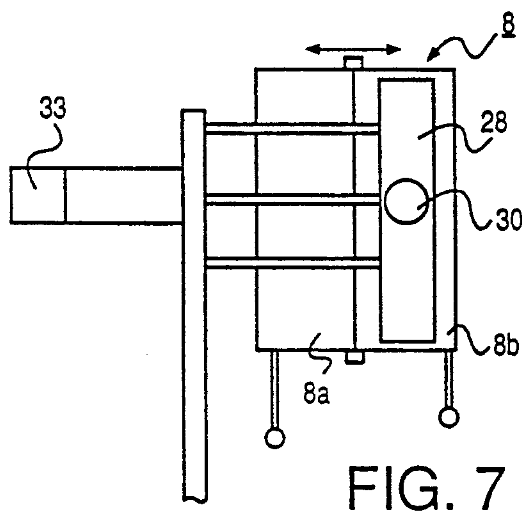
FIG. 7 shows a top plan view of the material supply member.
Figure 8:
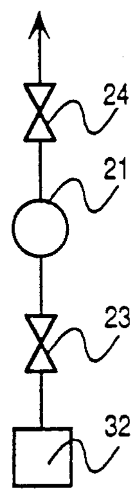
FIG. 8 shows a schematic diagram of pump connectors.

Material supply apparatus 28 (FIG. 5) is positioned over each of said pans 8 of said base member 1 via a support flange 27. A plurality of valves 31 which are operated by an air cylinder 30 are vertically movable over each of supply holes 29 which are formed in a bottom portion of said material supplying apparatus 28. The supporting pump 21 is connected with material tank 32 and said valves 23 and 24 of said supporting pump 21 are connected as shown in FIG. 8.

Figure 9:
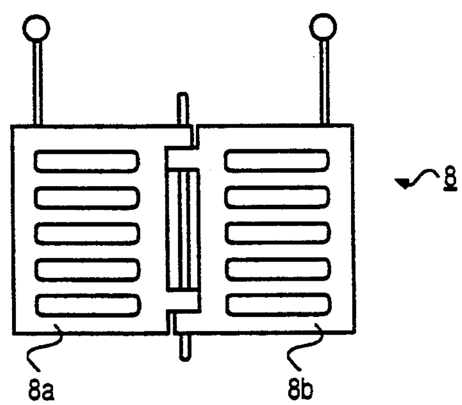
FIG. 9 shows a flat plan view of the pan in which the product is produced.

The rotary table 7 is rotated by driving motor 2 and piston 22 is operated via connecting axis 18 and arm 20. A certain amount of material from the material tank 32 is fed into said material supplying apparatus 28; valves 31 are lifted by air cylinder 30 and material is fed onto said pans 8. Gas is fed from said rotary gas connection joint 12 to gas burners 9 via cavity 11. Material supply apparatus 28 (FIG. 1) is moved reciprocally by cylinder 33 in the case of hinge typed pans 8, whereby material is respectively alternatively deposited in each of pan elements of said pans 8 (FIG. 9).

Figure 10:
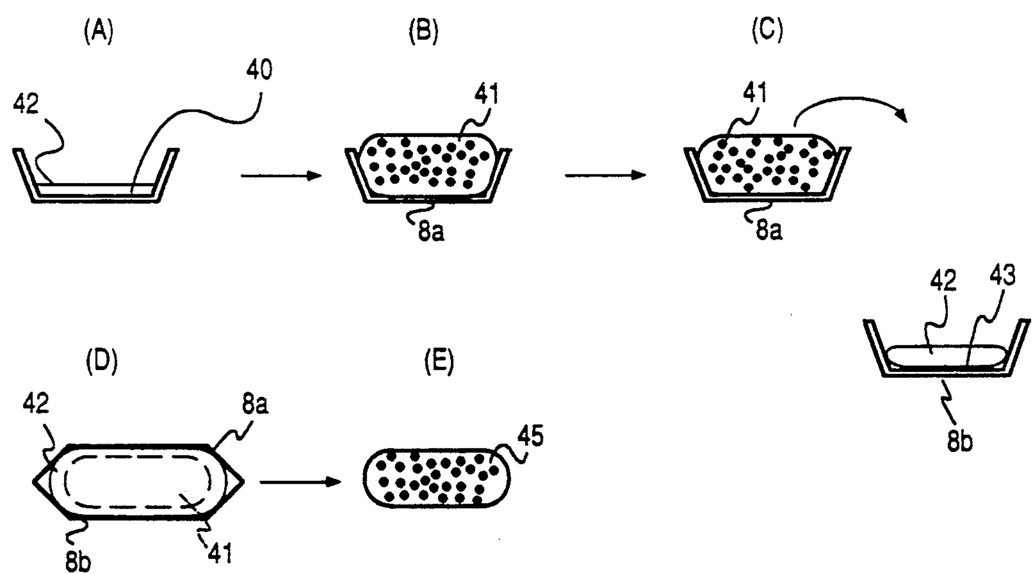
FIG. 10 illustrates the steps in the process of making egg foods and also illustrates an embodiment of the product.

An egg food product, such as a rice omelet, is made as follows: as shown in FIG. 10, a roasted egg film 40 is prepared in each of the pan elements 8*a* during one rotation of said table by placing egg material in each of the pan elements 8*a*. The roasting temperature is approximately 150°–160° C. and the elapsed time from raw to roasted state for the egg film contacting the pan element is about one minute. Then flavored rice 41 which adapts in shape to the inner shape of said pan elements 8*a* is placed on said roasted egg film 40. An unroasted portion 42 of said egg film 40 remains toward the peripheral portions of said pan element 8*a*. Then the rotary table 7 is rotated again and another roasted egg film 43 is placed and shaped in each of pan elements 8*b*; said other roasted egg film 43 also has a raw portion 42 thereof. Thus, after folding one pan element 8*a* over to another pan element 8*b* as shown by the arrow mark in FIG. 10(*c*), a portion 42*b* of the egg material in pan elements 8*a* and 8*b* is in a raw condition. Each of the roasted egg films 40 and 43 envelop said pre-shaped and flavored rice 41 as shown in FIG. 10(D), wherein the edge portions of the roasted egg films 40 and 43 are connected as one unit. Liquid portion 42*b* contacts rice 41 and upon further cooking, forms an egg food product such as a rice omelet, as shown in FIG. 10(E).

These are easily produced egg food products because the raw portions 42*b* inside said egg roasted films 40 and 43 are enveloped and held stationary. This means that said raw portion 42 does not overflow from the pan and an automatic process is effected, namely that raw egg directly contacts the flavored rice and, thus, the egg film and rice form as one body. It thus becomes easy to produce egg food products which can be readily frozen. Further, egg rice products and egg wheat products are also easily produced and are readily frozen.

Figure 11:
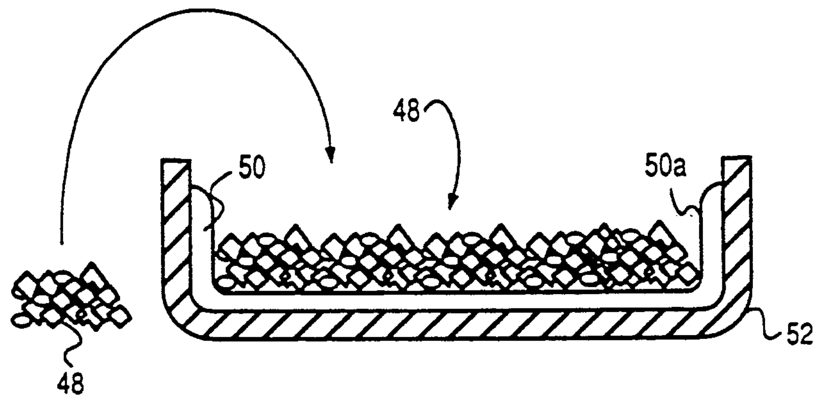
FIG. 11 shows a process of making an egg food product.

In accordance with the invention, a process is provided (as shown in FIG. 11 in cross section) for placing a quantity of rice 48 on a layer of egg 50 which is partly cooked in a pan 52 and still is partly raw (i.e., not gelled) on an inside portion 50*a* of the egg layer 50. Rice 48 is preferably heated to a temperature in the range of about 30° C. to about 130° C. before being placed on the egg layer 50. Egg layer inside portion 50*a* is preferably heated to a temperature exceeding about 60° C., but just below the temperature at which the inside portion 50*a* would gel. After heated rice 48 is placed on egg layer 50, egg layer inside portion 50*a* is further cooked until it gels. Thus the heated rice 48 and the egg layer 50 are firmly joined together by the further cooking of the egg layer 50. The indicated temperatures provide an optimum bonding of the rice 48 to egg layer 50.

Figure 12:
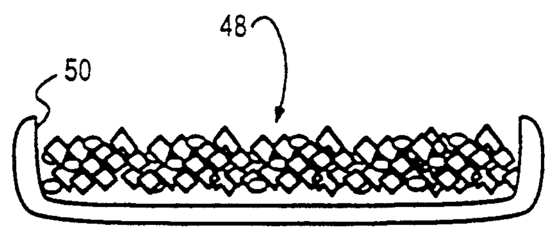
FIGS. 12 and 13 show an egg food product.

This process provides an egg food product which, as shown in FIG. 12 in cross section, includes a layer of rice 48 inside a half shell shaped (i.e., cup shaped shell) egg layer 50. The rice 48 may be a preformed rice shape, or other filling material may be used instead of rice. Use of heated (rather than cool) rice 48 advantageously speeds the further cooking of the egg layer 50.

Figure 13:
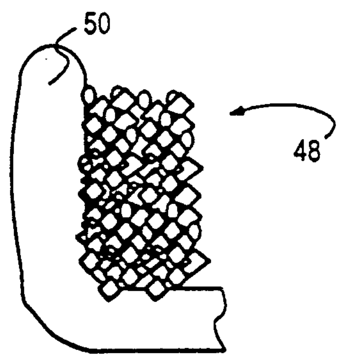

FIG. 13 shows an enlarged view of a portion of the egg food product of FIG. 12. As shown in FIG. 13, grains of rice 48 are embedded in the inner portion of egg layer 50, and none extend through the egg layer 50 to the outside of the egg food product. This egg food product has the advantage of firmly joining together the rice 48 and egg layer 50, to form a self-adhering body.

I claim:

1. A method of making an egg food product comprising the steps of:

cooking a first egg layer in a first pan partly so that a first portion of the first egg layer is heated to over about 60° C. but is not yet gelled, and a second portion is gelled;

providing a quantity of rice heated to between about 30° C. and about 130° C. and which is pre-shaped;

placing the quantity of rice on the first portion of the first egg layer;

further cooking the first egg layer so that a portion of the rice is embedded into the first portion of the first egg layer, and none of the rice is embedded in the second portion of the first egg layer;

cooking partly a second egg layer in a second pin; and joining the second egg layer to the first egg layer along an entire length of their respective edges by folding the first pan over into the second pan.

2. The method of claim 1, wherein the quantity of rice is flavored.

3. The method of claim 1, wherein the step of cooking includes the step of forming the first egg layer into a cup-shaped shell.

* * * * *